United States Patent [19]
Nayak et al.

[11] Patent Number: 5,833,161
[45] Date of Patent: Nov. 10, 1998

[54] LOW PROFILE MECHANISM FOR BIASED DRIVING OF DRIVEN ROLLER IN TAPE CARTRIDGE

[75] Inventors: Ash Nayak, Glendora; Kurt Buckland, Yorba Linda, both of Calif.

[73] Assignee: Seagate Technology, Inc., Scotts Valley, Calif.

[21] Appl. No.: 605,966

[22] Filed: Feb. 23, 1996

Related U.S. Application Data

[63] Continuation of Ser. No. 258,517, Jun. 10, 1994, abandoned.

[51] Int. Cl.$^6$ .................................................. G11B 15/32
[52] U.S. Cl. ................... 242/352.4; 242/349; 242/356.7
[58] Field of Search ............................. 242/352.4, 352.3, 242/352, 356.7, 349; 310/67 R; 360/96.4

[56] References Cited

U.S. PATENT DOCUMENTS

| | | | |
|---|---|---|---|
| 2,858,996 | 11/1958 | Switzer | 242/352 |
| 3,587,997 | 6/1971 | Wood | 242/356.7 |
| 4,445,159 | 4/1984 | Nemoto et al. | 360/137 |
| 4,663,681 | 5/1987 | Kodama | 242/356.7 X |
| 5,210,664 | 5/1993 | Perona | 360/96.3 X |
| 5,241,229 | 8/1993 | Katakura et al. | 310/67 R X |
| 5,272,579 | 12/1993 | Ohkubo et al. | 360/96.5 |
| 5,277,352 | 1/1994 | Ohkubo et al. | 226/188 |
| 5,315,462 | 5/1994 | Ohkubo et al. | 360/96.5 |
| 5,382,853 | 1/1995 | Von der Heide et al. | 310/67 R |

FOREIGN PATENT DOCUMENTS

| | | | |
|---|---|---|---|
| WO 92/22058 | 12/1992 | European Pat. Off. | G11B 15/28 |
| 26 51 765 A1 | 5/1977 | Germany | G11B 15/26 |

*Primary Examiner*—John Q. Nguyen
*Attorney, Agent, or Firm*—Fliesler, Dubb, Meyer & Lovejoy

[57] ABSTRACT

A low profile mechanism for biased driving of driven roller in tape cartridge includes a rotor-on-the-outside motor placed on a reciprocating base plate and moved by the base plate to engage a drive roller with a predefined control force. The drive roller is translatable such that it conveys all or part of the control force to the driven roller of a supplied tape cartridge.

50 Claims, 9 Drawing Sheets

LOW PROFILE MECHANISM FOR BIASED DRIVING OF DRIVEN ROLLER IN TAPE CARTRIDGE

This application is a continuation of Ser. No. 08/258,517, filed Jun. 10, 1994, now abandoned.

BACKGROUND

1. Field of the Invention

The invention relates generally to tape drives. The invention relates more specifically to tape drives that rotate the driven roller of a belt-type tape cartridge while applying a predefined contact force to the driven roller.

2. Cross Reference to Other Patent(s)

The disclosure of the following U.S. patent(s) is/are incorporated herein by reference:

(A) U.S. Pat. No. 5,210,664 issued May 11, 1993 to Perona, assigned to Iomega Corp., and entitled, LOW PROFILE TAPE DRIVE FOR DRIVING A MINI-DATA CARTRIDGE; and (B) U.S. Pat. No. 5,277,352 issued Jan. 11, 1994 to Ohkubo et al, assigned to Teac Corp., and entitled, REDUCED HEIGHT TAPE DRIVE.

3. Description of the Related Art

There is a long felt need in the computer industry to make data storage/retrieval devices that are compact, high-quality, and of low mass-production cost.

In the magnetic tape sector of the industry, so-called belt-type, tape cartridges have come into popular use. Each such cartridge has an elongated magnetic tape that is wound spirally about rotatable supply and take-up reels. The magnetic tape is routed past an opening at an edge of the cartridge for operative engagement with an external read/write head.

A belt capstan is provided within the cartridge; rotatably supported at the opened edge of the cartridge, for engaging with an out-of-cartridge driving-roller (oCDR). The out-of-cartridge driving-roller (oCDR) supplies rotational power to the in-cartridge belt capstan.

An in-cartridge, drive belt couples the belt capstan to the supply and take-up reels. Rotation of the belt capstan moves the in-cartridge drive belt and, through the coupling of the belt to the supply and take-up reels, unwinds the tape from the supply reel, moves the tape past the read/write head opening, and winds the tape onto the take-up reel.

During data read/write operations, it is desirable to move the tape longitudinally past the read/write head at a predefined speed. And it is therefore desirable to rotate the in-cartridge driven roller (iCDR) at a corresponding, predefined rotational velocity.

For purposes of clarity, the belt capstan within the tape cartridge is at times be referred to herein as the "in-cartridge driven roller" (iCDR) or more simply, the "driven roller". The out-of-cartridge driving-roller (oCDR) is referred to herein as the "driving roller" or more simply, the "drive roller".

Cartridge manufacturers usually specify a preferred range of "contact forces" with which the out-of-cartridge driving-roller (OCDR) is to engage against the in-cartridge driven roller (iCDR) in order to assure proper transfer of power and in order to provide a relatively long lifetime of error-free use for the tape cartridge. The preferred contact force between the drive and driven rollers is typically specified as being in the range of 14 ounces to 22 ounces.

Provision of the desired contact force has become a problem for tape drive designers who wish to simultaneously reduce the profile (height and width) of the tape drive mechanism to a bare minimum and who wish to create a design that is low in cost, simple to manufacture, and has a relatively long operational life span.

The design disclosed in the above-cited U.S. Pat. No. 5,210,664 (Perona '664 design) suspends a pancake-shaped electric motor on a pivot arm. The pivot arm pivots about a frame bracket. A metal roller is provided attached to an upper output shaft (rotor) of the pancake motor. A rubber-coated wheel is provided above a top portion of the pancake motor casing, adjacent the metal roller, so as to engage with and be spun by the metal roller.

The combination of the pancake motor, the metal roller, and the rubber-coated wheel; which combination is referred to here as the "suspended mass", is biased by a spring so as to pivot about a pivot point of the pivot arm, toward an inserted cartridge. The rubber-coated wheel on top of the pancake motor casing serves as the out-of-cartridge driving-roller (OCDR). The pivot force of the biasing spring defines the contact force between the in-cartridge driven roller and the out-of-cartridge drive roller.

The Perona '664 design has the advantage of assuredly translating the rotational velocity of the motor-driven metal roller to the in-cartridge driven roller (iCDR) irrespective of changes in the diameter of the rubber-coated wheel (drive roller). But the Perona '664 design also has some drawbacks.

The combined mass of the pancake motor, the metal roller and the rubber-coated wheel (which defines the suspended mass) places stress on the pivot point of the pivot arm.

The height of the Perona '664 arrangement is at minimum equal to the thickness of the pancake motor added to the height of the taller one of the metal roller and the rubber-coated wheel.

The width of the Perona '664 arrangement is at minimum equal to the diameter of the pancake motor plus the extension length of the pivot arm that supports the suspended mass.

These dimensional constraints limit the amount of size reduction that can be obtained for the Perona '664 design and the amount of functionality per cubic centimeter that can be provided within a low profile drive using this design.

The placement of the metal roller and rubber-coated wheel in the Perona '664 design, above the pancake motor, creates a cross-axial moment that is disadvantageously applied to the shaft bearings inside the pancake motor. The contact force between the metal roller and rubber-coated wheel exerts itself along a first horizontal plane to bear against the end portion of the motor shaft that carries the metal roller. But the motor shaft bearings are situated in a second horizontal plane that is spaced away vertically from the plane of action of the contact force (away from the first horizontal plane). As a result of this placement, the contact force applied to the output end of the motor shaft is translated into a cross-axial moment that is then applied to the motor shaft bearings. Such a cross-axial moment is disadvantageous in that it reduces the operational life span of the motor shaft bearings.

The diameter of the metal roller in the Perona '664 arrangement plays an important role in design considerations. The metal roller couples the rotational velocity of the motor output shaft to the in-cartridge driven roller (iCDR) by way of the rubber-coated wheel. The in-cartridge driven roller (iCDR) then converts the rotational velocity into the linear velocity of the tape by way of the in-cartridge belt.

Given a desired tape velocity, the motor speed must be increased as the diameter of the metal roller decreases, or conversely, the metal roller diameter must be increased as the motor speed is decreased. (The diameter of the driven roller is considered as a design constant.)

It is desirable to use lower motor speeds in tape drives in order to increase the longevity of the overall mechanism. But in the Perona '664 design, decreased motor speed leads to a need for a larger diameter for the metal roller, which then disadvantageously adds more mass to the suspended mass, increases the dimensions of the suspended mass (the combination of the pancake motor, metal roller and rubber-coated wheel); and leads to other undesirable consequences. As a result, a compromise has to be made between how slow the motor can turn in the Perona '664 design and how large a metal roller can be tolerated.

Although the above discussion focuses on the Perona '664 design, it is to be appreciated that other designs have been used for coupling motor power to the drive roller. In a so-called Viper™ tape drive available from Conner Peripherals (previously Archive) of Costa Mesa, Calif., an elastic belt couples the drive motor to a drive roller that is supported on a spring-biased pivot arm. Although this system does not have the problem of pivotally supporting the mass of a full motor, it relies on a belt and pulleys system which has its own complications (e.g., vibrations in the belt).

SUMMARY OF THE INVENTION

The invention overcomes the above-mentioned problems by providing a compact, low-profile, beltless drive mechanism for the biased driving of the driven roller within a supplied tape cartridge.

A tape drive mechanism in accordance with the invention is provided for driving the belt capstan of an inserted tape cartridge while applying a contact force within a prespecified force range to the belt capstan. Such a tape drive mechanism comprises: (a) a movable drive roller, the movable drive roller being movable along a first plane for engagement with the belt capstan; (b) a movable rotor-on-the-outside motor, the movable motor being translatable along the first plane for engagement with the drive roller; and (c) force generating means, operatively coupled to the motor, for applying a translational force to the movable motor, the translational force passing from the motor to the movable drive roller and from there to the belt capstan of the inserted tape cartridge to thereby produce the contact force within the prespecified force range between the belt capstan and the drive roller.

A method in accordance with the invention transmits rotational power from a motor to a driven roller while engaging the driven roller with a contact force (F1) of predefined magnitude. Such a method comprises the steps of: (a) providing a reciprocating base plate onto which the motor is mounted; (b) limiting movement of the reciprocating base plate substantially to one linear direction; (c) biasing the base plate with a control force (F2) exerted in the one direction; (d) providing a translatable drive roller that is translatable in the one linear direction and is engageable with a coplanar output portion of the motor; (e) engaging the driven roller against the translatable drive roller so as to translate the drive roller into engagement with coplanar output portion of the motor; and (f) setting the control force (F2) such that the force of engagement between the translatable drive roller and the driven roller is substantially equal to the predefined contact force (F1).

BRIEF DESCRIPTION OF THE DRAWINGS

The below detailed description makes reference to the accompanying drawings, in which.

DETAILED DESCRIPTION

Figure 1A:
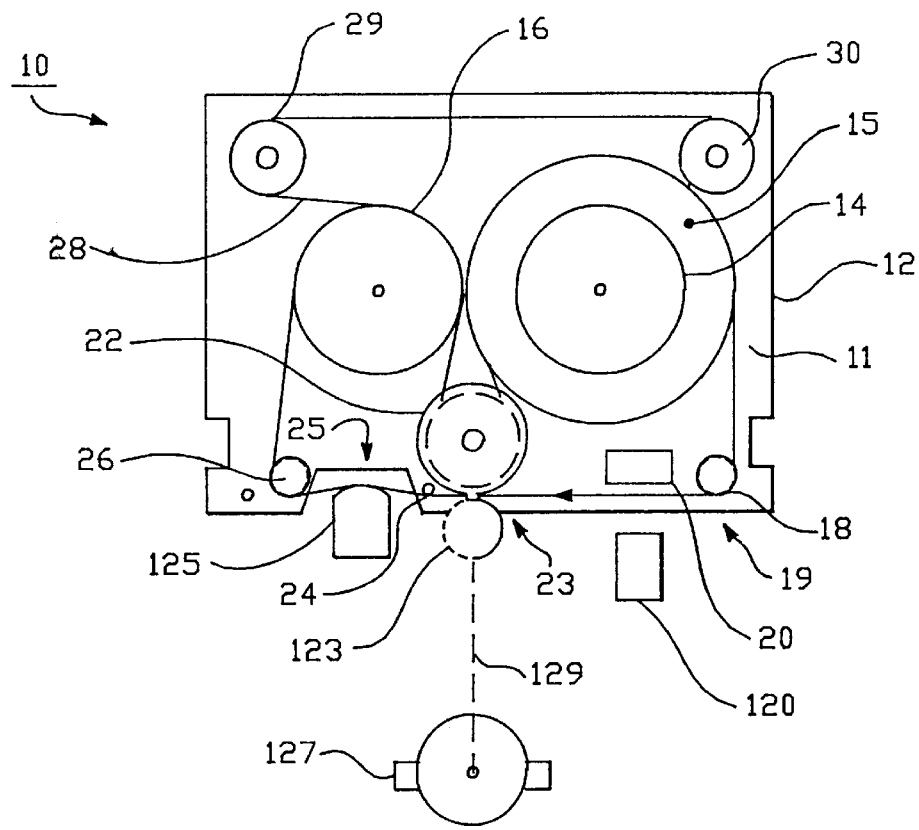
FIG. 1A is a top plan view of a belt-type tape cartridge.

FIG. 1A is a top plan view of a belt-type tape cartridge well known in the art. Examples include the DC-2000 which is a popular style of minicartridge well known in the field.

The tape cartridge 10 of FIG. 1A is comprised of a rectangularly-shaped, transparent plastic housing 11 placed over a rectangular metal base plate 12. A tape supply reel 14 and a take-up reel 16 are rotatably mounted between the housing 11 and base plate 12. An elongated magnetic tape 15 is spirally wound about reels 14 and 16. FIG. 1A shows the BOT (Beginning of Tape) position.

Tape 15 is routed from the supply reel 14 to a first fixed guide post 18 positioned at an operative front edge 19 of the cartridge 10. The tape wraps approximately 90° about the first fixed guide post 18 and then slidably moves forward along the operative front edge 19 of the cartridge 10.

As it moves along the front edge 19, the tape passes in front of an in-cartridge mirror 20 that forms part of a tape-interrupted optical path. A light sensing device 120, which is not part of cartridge 10, cooperates with mirror 20 to detect tape breakage, and other optically demarcated events such as the physical beginning (BOT) and the physical end (EOT) of the tape medium.

The tape 15 then passes under a rotatable belt capstan 22 and in front of a fixed guide pin 24. The tape next extends across a flapped opening 25, and wraps approximately 90° about a second fixed guide post 26 to return to the tape take-up reel 16.

A drive contact opening 23 is provided along the front edge 19 of the tape cartridge for allowing a rubber-covered drive roller 123, which is not part of cartridge 10, to engage with the in-cartridge belt capstan 22.

When the tape cartridge 10 is slidably inserted into a receiving slot (not shown) of a drive mechanism, a flap door (not shown) of the cartridge is pushed open to expose the flapped opening 25. A read/write head 125 engages with the tape 15 through the flapped opening 25. At the same time, the drive roller 123 engages with the belt capstan 22.

Below the belt capstan 22, a smaller diameter belt pulley (dashed circle) is provided for rotating with the belt capstan. A flat drive belt 28 is wrapped around the belt pulley. The drive belt 28 passes between the supply and take-up reels 14, 16 to frictionally contact with the outer portion of tape 15 wrapped about each. The drive belt 28 also loops about first and second belt rollers, 29 and 30.

A drive motor 127 couples to the drive roller 123 as indicated by dashed line 129 for transmitting rotational power to the drive roller 123. The drive roller 123 rotates the belt capstan 22, which in turn rotates the belt pulley and flat drive belt 28. As a result, the tape 15 is moved longitudinally past the read/write head 125 in accordance with the direction and speed of the rotational power applied to the belt capstan 22.

Figure 1B:
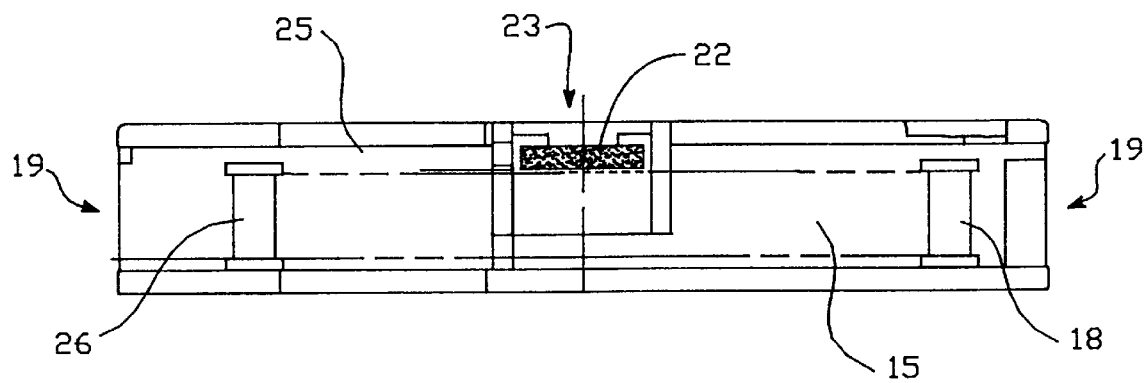
FIG. 1B is a front plan view of the belt-type tape cartridge.

FIG. 1B shows a front view of the cartridge front edge 19. Tape 15 is shown routed about the first and second fixed guide post, 18 and 26, and passing under the belt capstan 22, which is exposed through opening 23.

Proper operation requires that the drive roller 123 (FIG. 1A) registers properly with the cartridge opening 23 and that roller 123 engages with the exposed surface of the belt capstan 22 according to a specified contact force. As explained above, the application of this prespecified contact force within a compact structure presents several design problems.

Referring to the cross sectional side view of FIG. 2, a method and apparatus for applying the prespecified contact force F1 in accordance with the invention, between an in-cartridge driven roller (iCDR) 22 and an out-of-cartridge driving-roller (OCDR) 260 will now be described.

Figure 2:
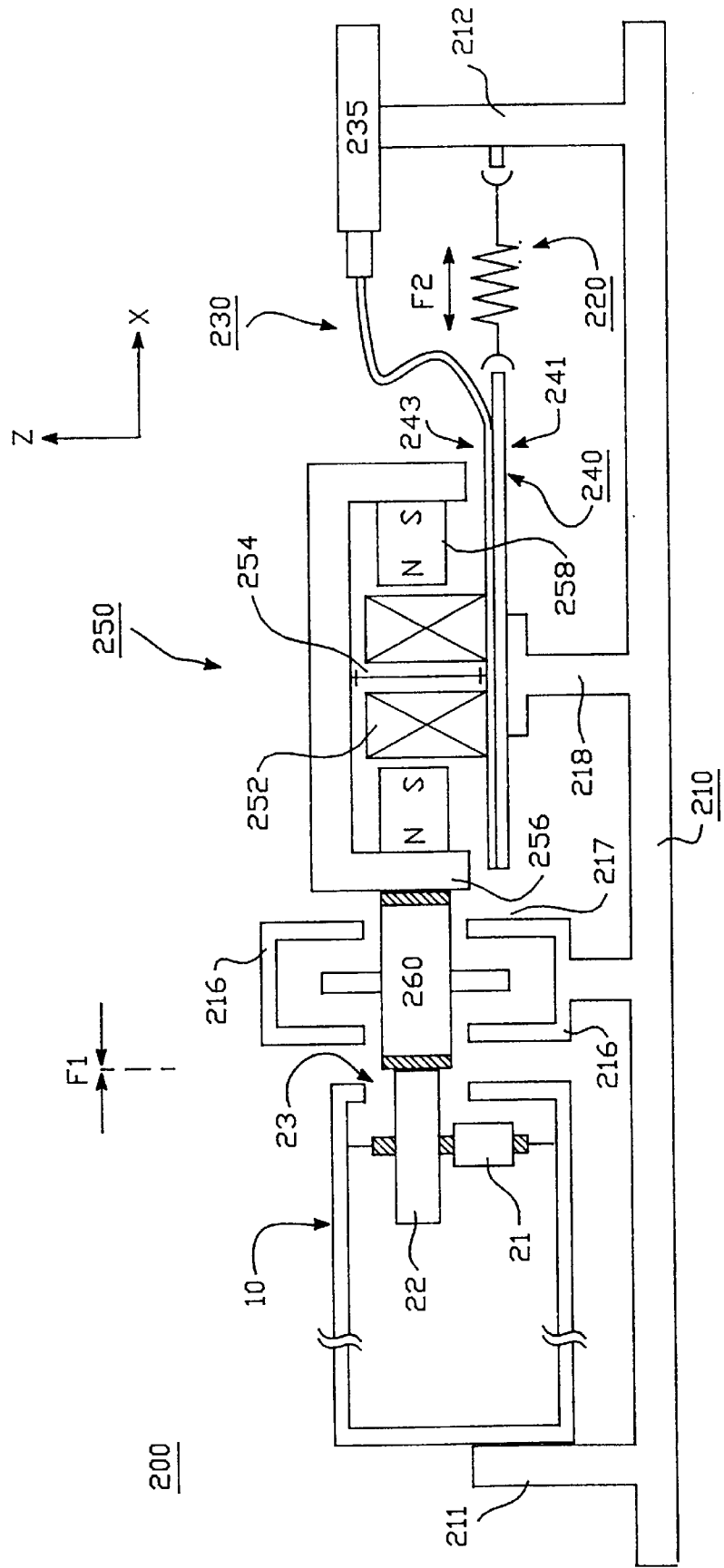
FIG. 2 is a simple schematic of a drive roller arrangement in accordance with the invention.

The drive mechanism of FIG. 2 is generally referenced as 200. This drive mechanism 200 includes a rigid frame 210 having first and second projections, 211 and 212, at opposed ends. A belt-type cartridge 10 is retained by the first projection 211 while a compressed spring 220 presses opposingly with a control force F2 against the second projection 212.

The compressed spring 220 applies its compression force F2 along a first horizontal direction (X direction) to bear against a linearly reciprocating base plate 240. The reciprocating base plate 240 is slidably supported on a support platform 218 of frame 210 to reciprocate in the first horizontal direction (X direction).

A rotor-on-the-outside electric motor 250 is attached to the reciprocating base plate 240. The base plate 240 is made of a relatively rigid, electrically insulative material, and has a printed circuit 243 formed on a top surface thereof. A bottom portion 241 of the base plate 240 is preferably plated with a magnetic shielding material such as nickel.

A stator portion 252 of the motor 250 is fixed to the top of the base plate 240 and is coupled by way of the printed circuit 243 to a flexible ribbon cable 230 that extends flexibly off of the base plate 240. One end of the flexible ribbon cable 230 connects to the base-plate printed-circuit 243 while a second end connects to an electronics module 235 mounted on frame 210. The electronics module 235 includes a printed circuit board which overlies the spring 220 at least partially.

A rotor bearing 254 is fastened to one or both of the stator 252 and the base plate 240 for rotatably supporting a cup-shaped (e.g., cylindrical) outer rotor 256. Axial play is preferably kept to a minimum in the vertical direction (Z-axis) by using a preloaded top and bottom ball bearing design. The strain moment on the bearing balls is minimized by arranging the bearing balls either centrally in the same horizontal plane that cuts centrally through the contact area of drive roller 260 and the belt capstan 22, or symmetrically about this horizontal plane. The effective same-plane orientation of the bearing 254 with the contact force F1 of the drive roller 260 and the belt capstan 22 helps to minimize the magnitude of the cross-axial moment applied to the motor bearing 254 and thereby increases its operational life span.

The outer rotor 256 is arranged open-side down, as shown to surround the stator 252. The vertical height of the outer rotor 256 is preferably equal to or less than approximately two times the vertical height of the outside diameter of the driving-roller (oCDR) 260. In one embodiment, the driving-roller 260 has a height of 0.173 inch and the outer rotor 256 has a height of 0.460 inch.

Permanent magnets 258 are fixedly distributed about the inside diameter of the cup-shaped rotor 256 for interacting magnetically with the enclosed stator 252. (The permanent magnets 258 can be arranged all with one pole, e.g., South, facing inwardly or they can be arranged to have alternating patterns of inwardly-facing South and North poles.)

The outer rotor 256 is made of a magnetic material (e.g., a low carbon steel) and functions to complete the magnetic circuit for the flux of the permanent magnets 258 and the stator 252. It also shields external devices from the internal flux fields of the motor 250.

Many design possibilities will become apparent to those skilled in the art for implementing the rotor-on-the-outside electric motor 250. In one embodiment, the motor 250 is a DC brushless motor designed to be driven by a 12V DC power supply. This power is supplied from the electronics module 235 by way of the flexible ribbon cable 230 and the base-plate printed circuit 243. Internally, the one embodiment of motor 250 has a three phase, Y coil connection, and twelve poles and nine slots. Commutation synchronization is carried out electronically by the back-EMF method. The motor 250 is designed to operate at nominal operating speeds of 810 RPM and 1216 RPM and to power an external torque load of no less than 4.8 ounce-inches in continuous mode. Electronics module 235 includes a 3-phase motor drive circuit for driving the 3-coil Y-connected stator 252. The magnetic paths of the motor are configured to limit external flux leakage to no more than four Gauss.

The surface of the motor rotor 256 is nickel plated for corrosion resistance. The outer diameter surface of the rotor 256 abuts against one side of a coplanar, rubber-coated drive roller 260. An opposed side of the drive roller 260 presses against the belt capstan 22 of the tape cartridge 10. The belt capstan 22 drives an in-cartridge belt pulley 21 below it. The cartridge drive belt 28 (FIG. 1A) wraps about the belt pulley 21.

The drive roller 260 of drive mechanism 200 is rotatably retained within a capture-well 216 of the frame 210 but is permitted to translate laterally within this well 216 to some extent in the first and second horizontal directions (X and Y-axes). It is aligned in the vertical direction (Z-axis) to register with and engage against the belt capstan 22 as shown.

Since the reciprocating base plate 240 and drive roller 260 are free to move in the first horizontal direction (X-axis), the contact force F1 between the belt capstan 22 and drive roller 260 is defined by the compression force F2 of spring 220. Spring 220 is designed to generate a relatively constant compression force F2 that translates via plate 240, rotor 256 and roller 260, into a contact force F1 of a magnitude within the desired contact force range (e.g., 14 to 22 ounces, nominally set to 20 ounces). It should be noted that control force F2 can be equal to the desired contact force F1, but some portion of the F2 force vector might be dissipated at points other than the contact area of the drive roller 260 and belt capstan 22, in which case the control force F2 may have to be made larger than the desired contact force F1.

The mechanical arrangement of FIG. 2 provides a compact, simple, and low profile way for driving the belt capstan 22 of a tape cartridge 10.

Note that the outer rotor 256 serves multiple functions. First, it defines part of the magnetic flux path of the motor 250 and provides the rotational output power of the motor 250. Second, the rotor 256 transmits the rotational output power of the motor directly to the drive roller 260. Third, the rotor 256 transmits part or all of the control force F2 of spring 220 from the base plate 240 horizontally to the drive roller 260 along the plane of action of the contact force F1. Fourth, the rotor 256 shields devices external of the motor 250 from internal magnetic fields of the motor. Fifth, the low profile height of the rotor 256 allows the vertical direction (Z-axis) profile of the entire mechanism to be kept relatively small (e.g., one inch or less) and/or permits integration of additional functional elements (e.g., electronic components) in the vertical plane occupied by the motor 250.

The capture-well 216 of frame 210 also serves multiple functions. First, when cartridge 10 is removed, the capture-well 216 prevents the drive roller 260 from being ejected out of the mechanism due to the non-countered force F2 of the compression spring 220. (Spring 220 does not apply a continuous force against drive roller 260 in the no-cartridge state. Instead, base plate 240 abuts against an outer portion 217 of the capture-well 216 in the no-cartridge state.) Second, if a cartridge 10 is inserted into the drive mechanism 200 with excessive force, the capture-well 216 prevents the excessive force from being transmitted inwardly such that it can damage the rotor-on-the-outside electric motor 250 or the base plate 240. The capture-well 216 absorbs the excessive force.

Figure 3A:
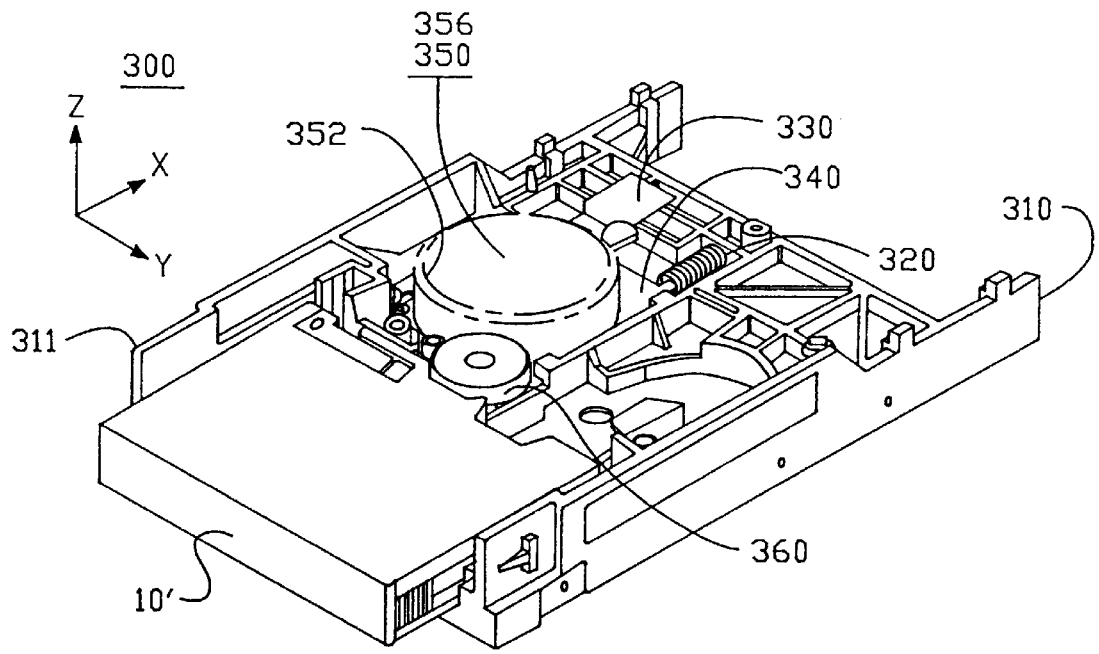
FIG. 3A is a first, partial perspective view of a tape drive (without printed circuit boards) in accordance with the invention, with a removable tape cartridge slidably inserted therein.
Figure 3B:
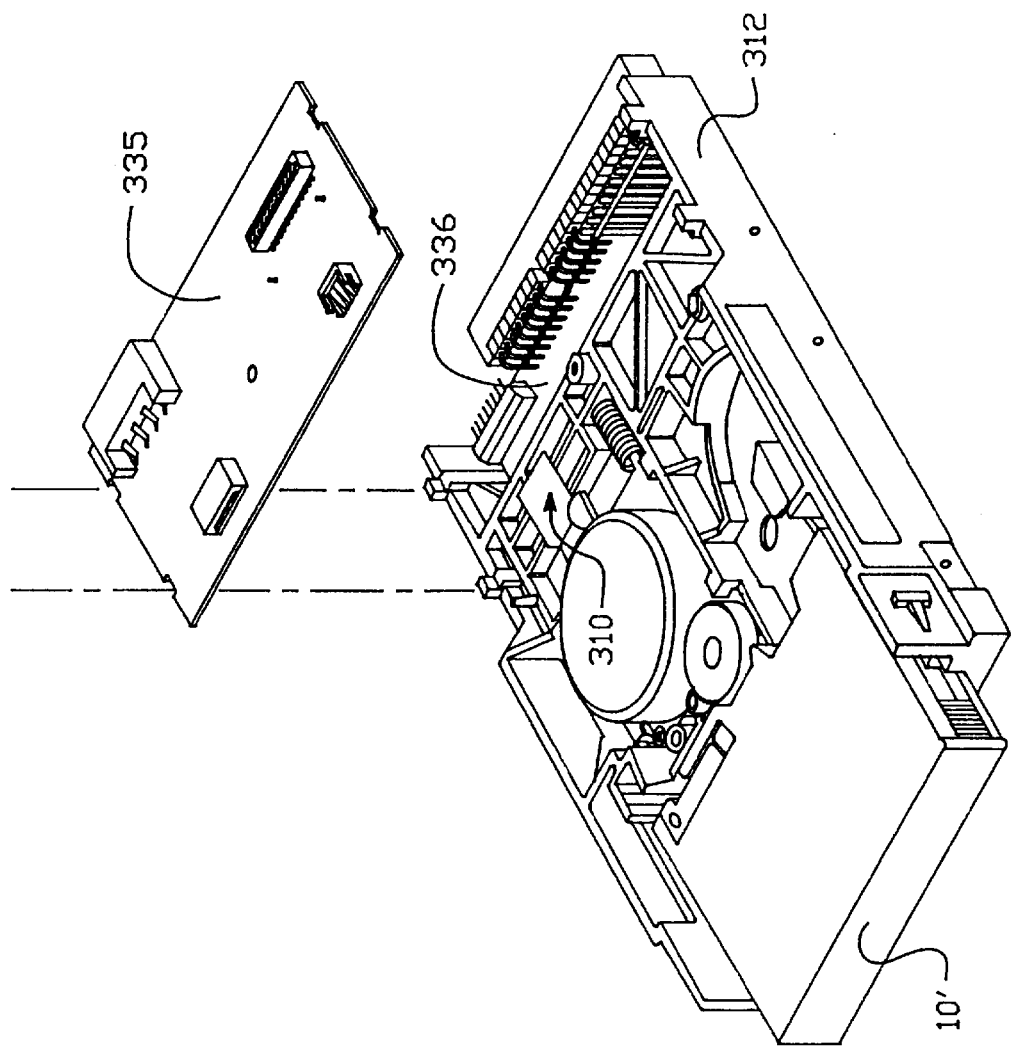
FIG. 3B is a second, partially-exploded perspective view of the tape drive of FIG. 3A, further showing two printed circuit boards that mount to the drive frame, one on top of the frame, and one below the drive motor.
Figure 3C:
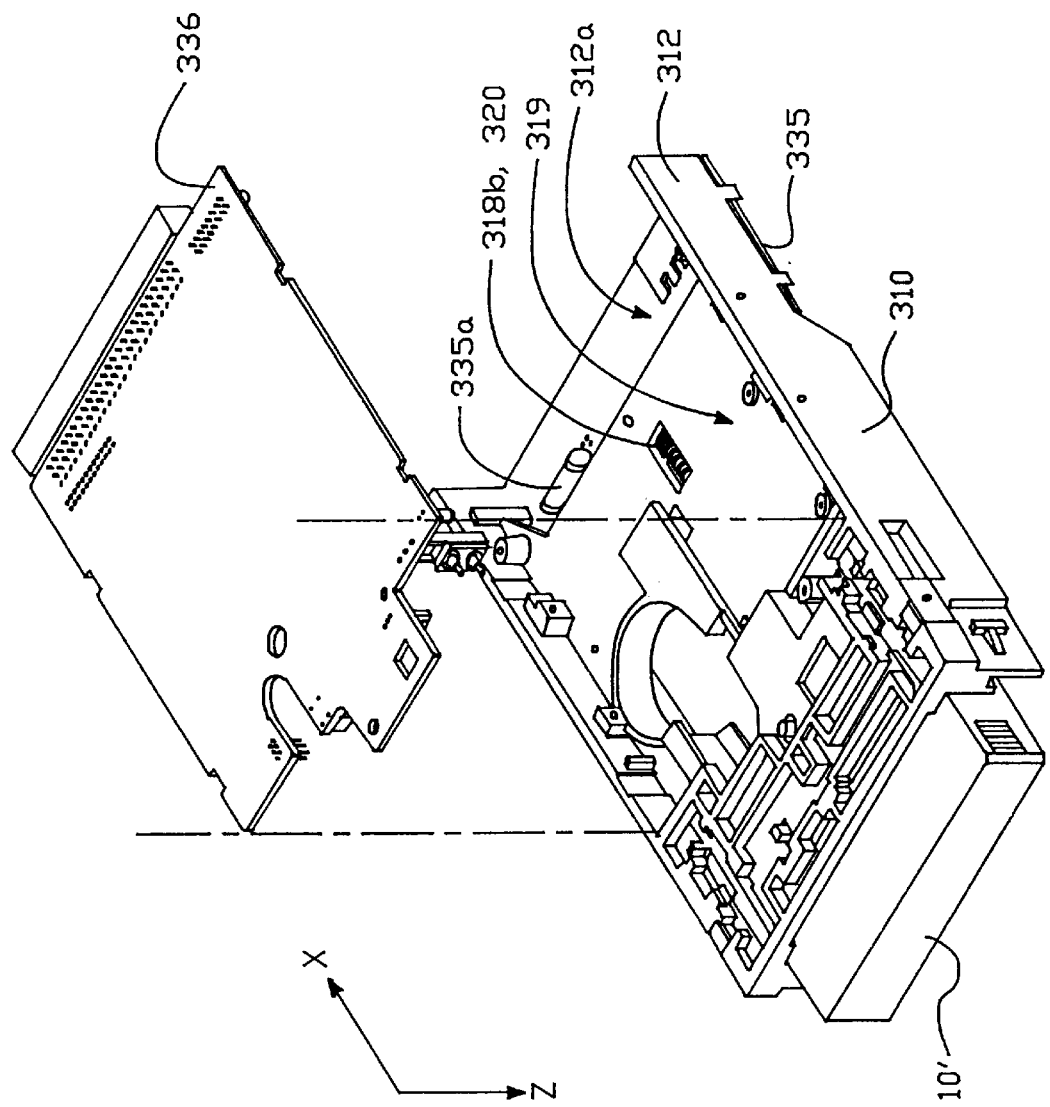
FIG. 3C is a third, partially-exploded perspective view of the tape drive of FIG. 3A, as seen flipped over, with the two electronics boards being mounted to the drive frame.

Referring to FIGS. 3A–D, details of a one-inch high, low-profile tape drive 300 in accordance with the invention will now be described.

Where practical, like reference symbols and numbers in the "300" series will be used for elements of FIGS. 3A–C which correspond to but are not necessarily the same as the elements represented by similar symbols and reference numbers in the "200" series in FIG. 2.

The low-profile tape drive 300 includes a relatively rigid, one-piece frame 310 that is molded from an appropriate composite material such as the polycarbonate family of plastics. Appropriate additives may be added to the polycarbonate material to provide strength, durability and other desirable characteristics. For example, glass fibers are added to the composite to improve rigidity. Teflon is added to provide a frame surface having a relatively low coefficient of friction. (During molding, the teflon particles tend to migrate to the outer surface areas of the composite to thereby give it a low friction surface.)

Figure 4:
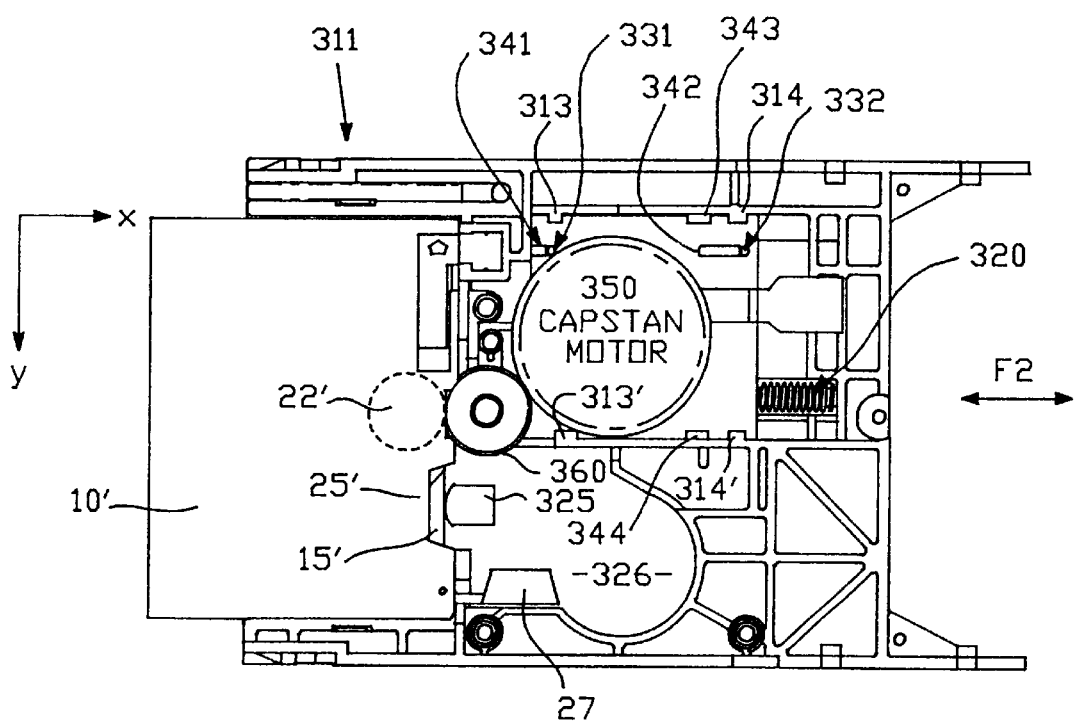
FIG. 4 is a top plan view of the assembly shown in FIG. 3A.

The frame 310 includes a front-end cartridge-receiving portion 311 which is adapted to receive and retain a removably insertable, quarter inch minicartridge 10'. FIG. 3A shows the minicartridge 10, slidably inserted into the front-end receiving portion 311. Guide rails (not shown) within the receiving portion 311 guide the mini-cartridge 10' into registration with a drive roller 360 and read/write head 325 (FIG. 4) of the tape drive 300. The guide rails also automatically open a flap door 27 (FIG. 4) of cartridge 10' so as to expose opening 25' for the read/write head 325. Space is provided along the interior side wall of the drive frame 311 for receiving the automatically-opened flap door 27 as shown in FIG. 4. Spring-biased rollers (not shown) within the front-end cartridge-receiving portion 311 snap into indents of the cartridge 10 to thereby help keep the cartridge 10 in place once the cartridge is inserted into the cartridge-receiving portion 311.

Adjacent to the flap-door receiving area is another area 326 of the frame which supports a head translating mechanism (not shown) that moves the head 325 in the vertical direction (Z-axis) to different tracks of the tape 15'.

The front-end cartridge-receiving portion 311 is 1.0 inch in height and 3.95 inches in width. The frame body, including front and section 311 is approximately 6.0 inches long. The entire drive mechanism 300 (including circuit boards not shown in FIG. 3A) can be enclosed in a rectangular housing having internal dimensions of approximately 1.0 inch height, 4.0 inches width, and 6.0 inches length. Such a casing can be easily inserted in a standard 1½ inch floppy drive bay or into smaller volumes as desired.

As seen in the top plan view of FIG. 4, when the minicartridge 10' is fully inserted into the front-end receiving portion 311, the in-cartridge belt capstan 22' comes into spring-biased contact with a rubber-covered drive roller 360. At the same time, the drive roller 360 comes into spring-biased contact with the outer diameter of a rotor-on-the-outside electric motor 350 (hereafter also drive motor 350). The rotor is cylindrical in shape, the cylindrical shape having an open bottom and a closed top.

The cylindrical rotor 356 has a diameter of approximately 1.60 inch and a height of approximately 0.460 inch. The closed top surface of the cylindrical rotor 356 aligns just below, but almost flush with the top of the one inch height of frame 310 (approximately 0.05 inch clearance).

The drive roller 360 has a diameter of approximately 0.750 inches and a height of approximately 0.193 inches. The drive roller 360 is aligned to engage with the bottom portion of the 0.46 inch height of the motor rotor 356, thereby allowing a vertically-translatable support plate (not shown) to pass over the drive roller 360. The vertically-translatable support plate supports a head-translating mechanism (not shown) generally provided within area 326.

The stator portion (dashed cylinder 352) of motor 350 is fixed to a sliding base plate 340. It is to be noted that the dashed circle representing stator portion 352 is not to scale. The relative scale of diameters of the cylindrical rotor 356 and the cylindrical stator portion 352 is better represented in FIG. 2, by respective cross sections 256 and 252.

The base plate 340 reciprocates linearly in the front-to-back direction (X-axis) of frame 310. As seen in FIG. 4, two longitudinal slots, 341 and 342 are defined in base plate 340 extending in the X direction. Base plate guiding pins 331 and 332 are press fit into the frame 310 to project through the longitudinal slots 341 and 342 and to thereby guide the movement of the reciprocal base plate 340 along the longitudinal direction (X direction).

Four frame tabs 313, 313', 314 and 314' extend integrally from the frame over base plate 340 to block translation of the base plate 340 in the vertical direction (Z axis). Frame tabs 313 and 313' are positioned opposite to one another along the Y-direction at a midportion of the frame just behind the front-end cartridge-receiving portion 311 of the frame.

Frame tabs 314 and 314' are positioned opposite to one another along the Y-direction at a back portion of the frame. (The X-direction is the front to back direction moving from the front-end cartridge-receiving portion 311 of the frame back to a board-supporting rear section 312 of the frame. The Y direction is the left to right direction facing the front-end cartridge-receiving portion 311 of the drive 300.)

Assembly slots 343 and 344 are defined at the lateral edges of base plate 340 for allowing vertical insertion of plate 340 over the rear frame tabs 314, 314' during manufacture. After the base plate 340 is installed down over the rear frame tabs 314, 314', the plate 340 is slid forwards (in the −X direction) to move the assembly slots 343 and 344 beyond the rear frame tabs 314, 314' and to thereby position the plate 340 for vertical retention by frame tabs 314 and 314'.

Figure 5:
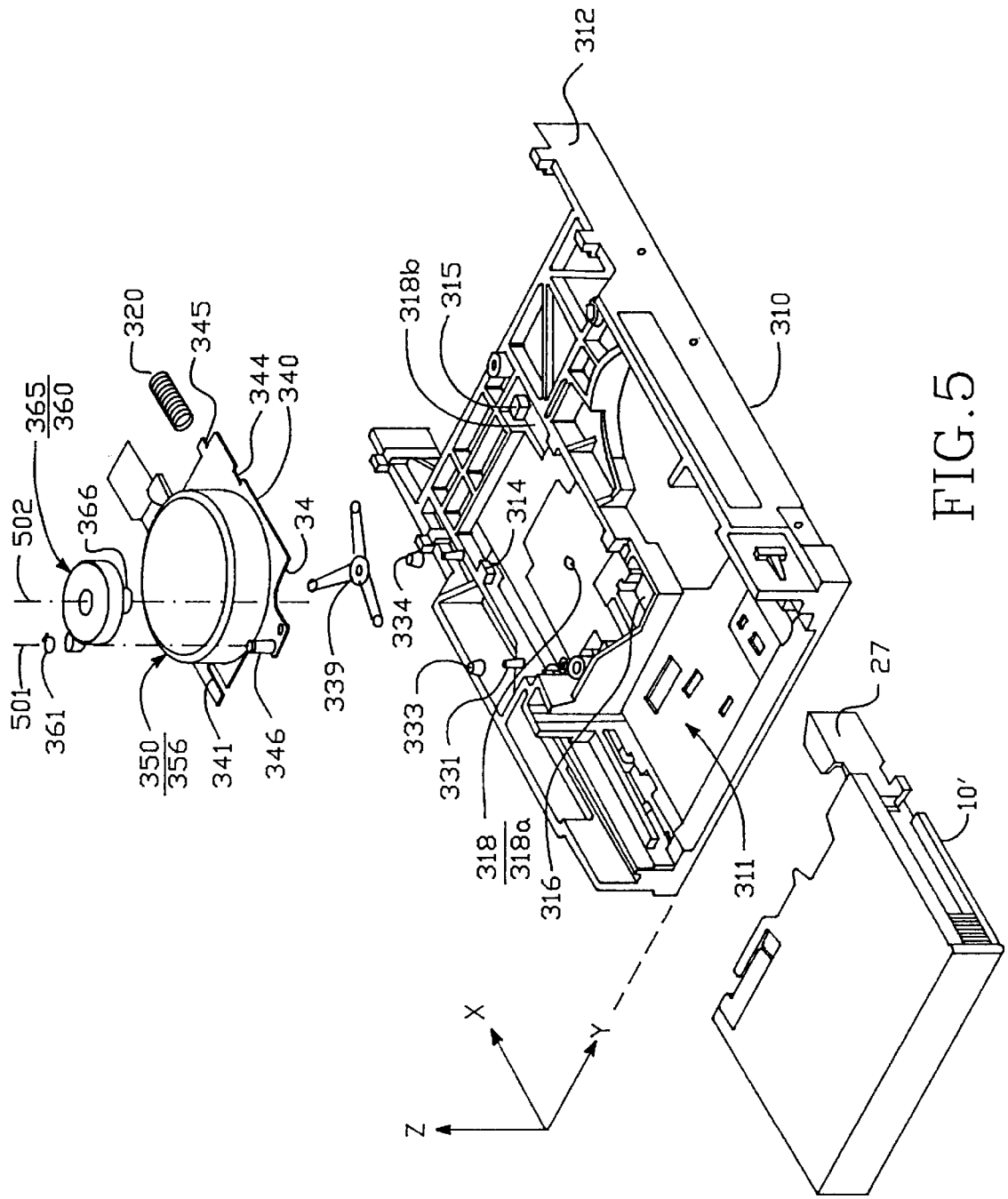
FIG. 5 is an exploded perspective of the assembly shown in FIG. 3A (without the top and bottom printed circuit boards)

Referring to the exploded perspective view of FIG. 5, below the base plate 340 there is an integral portion of the molded frame 310 that defines a so-called "half-height support platform" 318. This half-height support platform 318 is positioned along a horizontal plane (X and Y-axes) approximately midway between the top and bottom of the drive frame 310. The support platform is approximately 0.10 inches in thickness.

Below the support platform 318 there is defined a rectangular, lower cavity 319 (seen in the up side down view of FIG. 3C) of approximately 0.35 inches in height. This rectangular cavity 319 is used to accommodate a SCSI electronics board 336 which will be described below.

The 1.0 inch height of the drive in the vertical plane (Z-direction) is therefore occupied by the 0.46 inch height of the motor 350, the 0.10 inch thickness of the support platform 318, the 0.35 inch height of the lower electronics cavity 319, 0.10 inches of top and bottom case clearances, and approximately 0.08 inch of other miscellaneous heights (e.g., the base plate 340).

Side elevational ridges are integrally provided on the half-height support platform 318, extending in the X-direction along the edges of the support platform 318 for spacing the reciprocal base plate 340 slightly above a central, valley portion of the support platform 318. (The base plate 340 is captured in the Z direction between the tops of the elevational ridges and the bottoms of the frame tabs 313, 313', 314 and 314'. The base plate 340 slides against the bottoms of frame tabs 313, 313', 314 and 314' when it reciprocates as a result of lift provided by a next-described, base plate biasing spring 339).

A spring-locating projection 318a is provided integrally projecting up from the center of the valley portion of support platform 318. A tripod-shaped base-plate biasing spring 339 is fitted onto projection 318a. A hole at a bottom vertex of the tripod-shaped spring 339 fits over projection 318a. The three arms of spring 339 extend upwardly to apply a lifting force to plate 340. A conventional gel-type lubricant such as flurocarbon gel 866 available from W. F. Nye Inc. of New Bedford, Mass. is applied to the tops of the spring arms to minimize friction between the base plate biasing spring 339 and the base plate 340.

A rectangularly-shaped, spring-accommodating hole 318b is defined at a rear portion of the support platform 318 for accommodating a helical loading spring 320. (The bottom side of the spring-accommodating hole 318b and spring 320 is seen in FIG. 3C.) A first spring retaining tab 315 is integrally formed to protrude forward (in the −X direction) from the frame 310 at a back end of the spring-accommodating hole 318b. The spring retaining tab 315 is sized for insertion into a back opening of spring 320. A second spring retaining tab 345 is defined on the reciprocal base plate 340, extending in the forward direction (+X direction), for insertion into a front opening of spring 320. After assembly, retaining tabs 315 and 345 retain the loading spring 320 within the spring-accommodating hole 318b.

Still referring to FIG. 5, the method by which the tape drive mechanism is assembled will now be described.

The base plate biasing spring 339 is first inserted onto the spring-locating projection 318a of the frame. Base plate 340 is next lowered onto spring 339 such that the opposed assembly slots 343 (FIG. 4) and 344 slip down past the rear plate retaining tabs 314 and 314' of frame 310. At the same time, the front edge of base plate 340 slides down behind the opposed front retaining tabs 313 and 313' of frame 310. And at the same time, base plate slots 341, 342 fit over base plate guiding pins 331, 332. (Bushings 333, 334 are prefitted over pins 331, 332 before plate 340 is lowered over the pins.)

The drive motor 350, which is already assembled on base plate 340, is held down and the base plate assembly is slid forward (in the −X direction). Assembly slots 343 and 344 move past the rear frame tabs 314, 314'. The front edge of base plate 340 moves past front frame tabs 313, 31'. The four frame tabs 313, 313', 314 and 314' then function to retain the base plate 340 in position, suspended just above the half-height support platform 318.

The helical loading spring 320 is next compressed and released into place so its back and front ends respectively fit over the first spring retaining tab 315 of the frame and the second spring-retaining tab 345 of the motor base plate.

Figure 6:
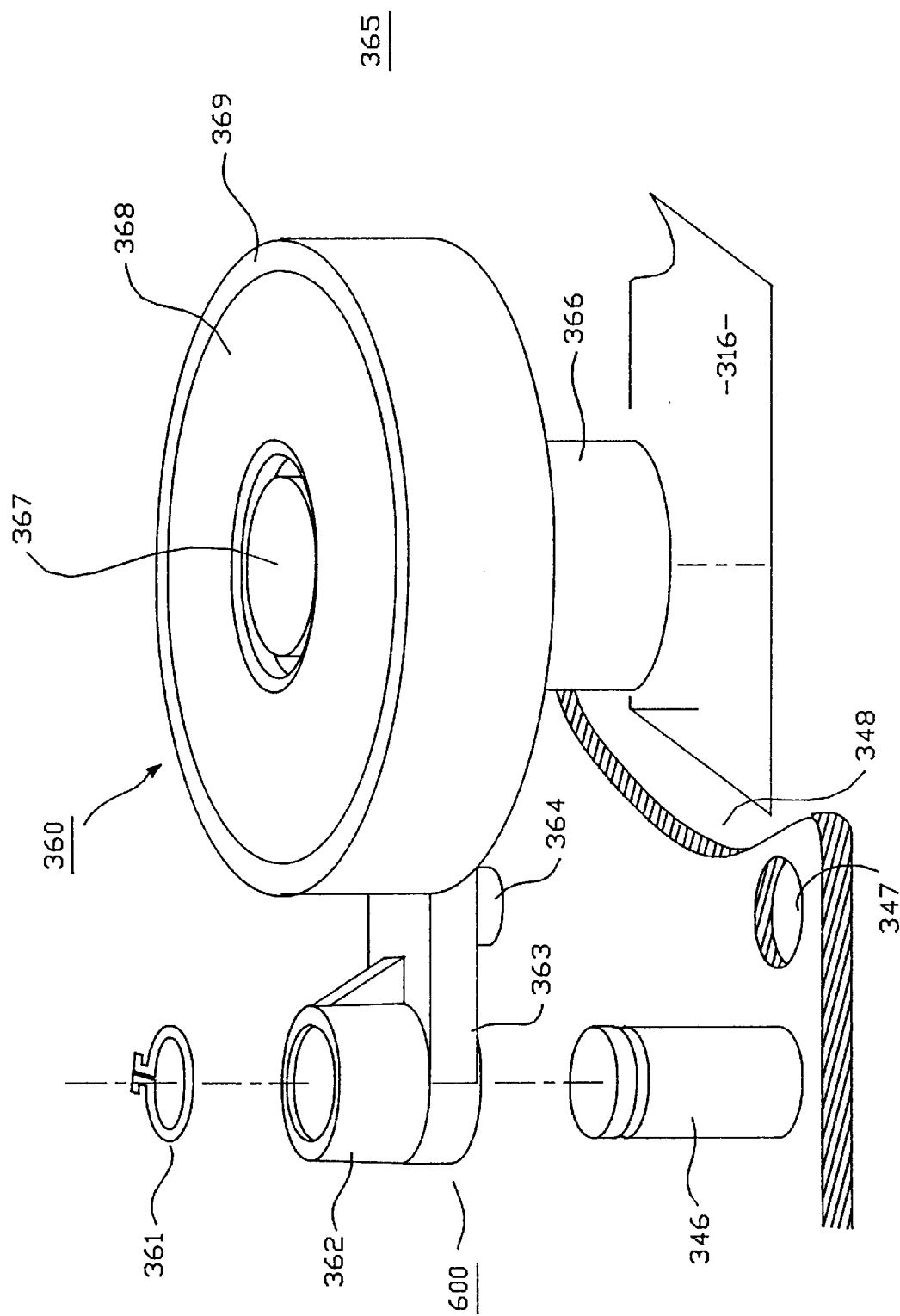
FIG. 6 is a perspective view of the drive roller assembly.
Figure 7:
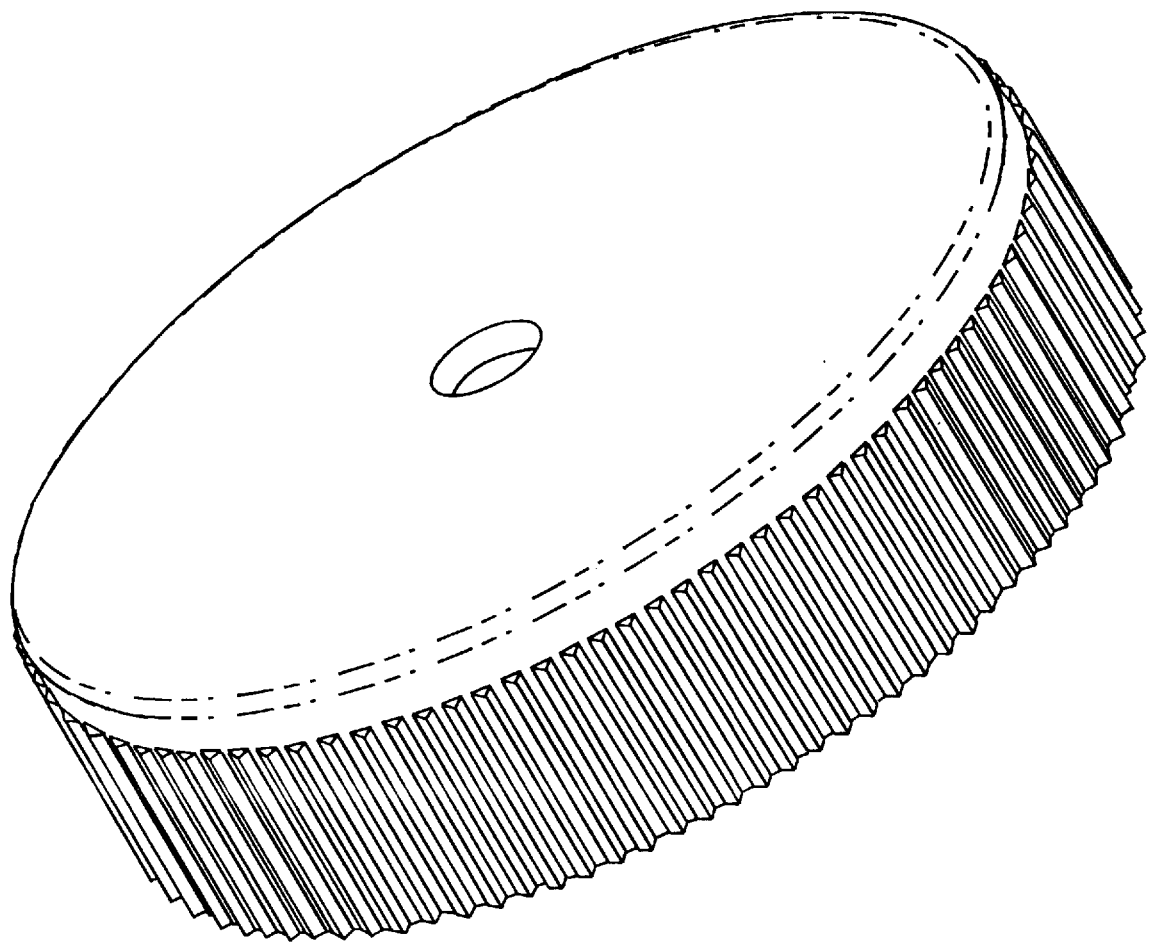
FIG. 7 is a perspective view of a rotor having gear-like serrations.

An assembly pivot pin 346 is prefastened to a front end of base plate 340. A drive roller pivot assembly 365, which is better seen in FIG. 6, is next slipped over the assembly pivot pin 346 as indicated by a first dash-dot assembly line 501 in FIG. 5. A downward protrusion 366 of assembly 365 fits into a capture well 316 of frame 310 during this operation as indicated by a second dash-dot assembly line 502 that is vertically extendible down into capture well 316.

Once the drive roller pivot assembly 360 is in place, the capture well 316 operates to prevent the base plate 340 from sliding backward (+X direction) to a position where assembly slots 341, 342 can slip back out over the rear frame tabs 314, 314'. A retaining ring 361 is slipped over a corresponding groove of assembly pivot pin 346 to hold the drive roller assembly 365 in place. As seen in the exploded view of, FIG. 5 for example, an extra-thick L-shaped member projects up integrally from the support platform 318 to define the back wall of capture well 316. This L-shaped member absorbs the force of overly-zealous insertions of the cartridge 10 into the front-end cartridge-receiving portion 311.

FIG. 6 shows the drive roller pivot assembly 365 in greater detail. Capture protrusion 366 extends past a front cutout 348 of base plate 340 to sit in capture well 316 of the molded frame 310. The capture well 316 limits the reciprocal movement of the base plate 340 relative to the frame to the extent allowed by the pivoting of the drive roller pivot assembly 365 about assembly pivot pin 346 and by the play of capture protrusion 366 within the capture well 316.

The drive roller pivot assembly 365 includes a die-cast pivot arm 600 made of a suitable metal such as a commercial grade aluminum alloy. The pivot arm 600 comprises a sleeve 362 that slides over and pivots about the assembly pivot pin 346. It also comprises an extension 363 connecting the sleeve 362 to capture protrusion 366. The pivot arm 600 further comprises a bearing post 367 that extends upwardly from the top of extension 363 for rotatably supporting the drive roller 360.

A downwardly-projecting cylindrical member 364 is provided on the bottom of pivot extension 363 for mating with a base capture hole 347 formed in the base plate 340. The diameter of the base capture hole 347 is larger (by approximately 0.025 to 0.035 inch) than the diameter of the downwardly-projecting cylindrical member 364 so that extension 363 can pivot to a limited degree about assembly pivot pin 346. The base capture hole 347 works to limit the magnitude of pivotal vibrations of the drive roller 360 relative to the base plate 340 when the tape drive 300 is subjected to mechanical shock.

The drive roller 360 is formed of a cylindrical core portion 368 made of an easily-machinable soft metal such as brass. The drive roller 360 further includes an outer perimeter portion 369 made of a rubber-like material such as polyurethane which is coated about the outer diameter of the core portion 368. In one embodiment, the perimeter portion 369 is composed of 0.030 inch thick polyurethane having a hardness of 75 Shore A.

Referring to FIG. 3C, after the base plate assembly (320, 340, 350, 360) is installed, the low profile of the assembly makes it possible to install a relatively large electronics board 336 in the lower cavity 319. Note that electronics board 336 extends through the vertical volume occupied by the rotor-on-the-outside electric motor 350.

In the illustrated embodiment, the lower electronics board 336 includes SCSI interface circuitry for coupling the tape drive 300 to a SCSI bus (Small Computer Standard Interface bus). Motor drive circuitry is contained in the upper electronics board 335 (FIG. 3B) that mounts to the top of the molded frame 310. A vertical cutout 312a at the rear of the frame 310 is used for electrical interconnection of the upper and lower electronics boards, 335 and 336. The vertical cutout 312a is also used to accommodate high profile electronic components such the filter capacitor 335a shown in FIG. 3C protruding from the back of upper electronics board 335 into the volume of vertical cutout 312a.

Figure 3D:
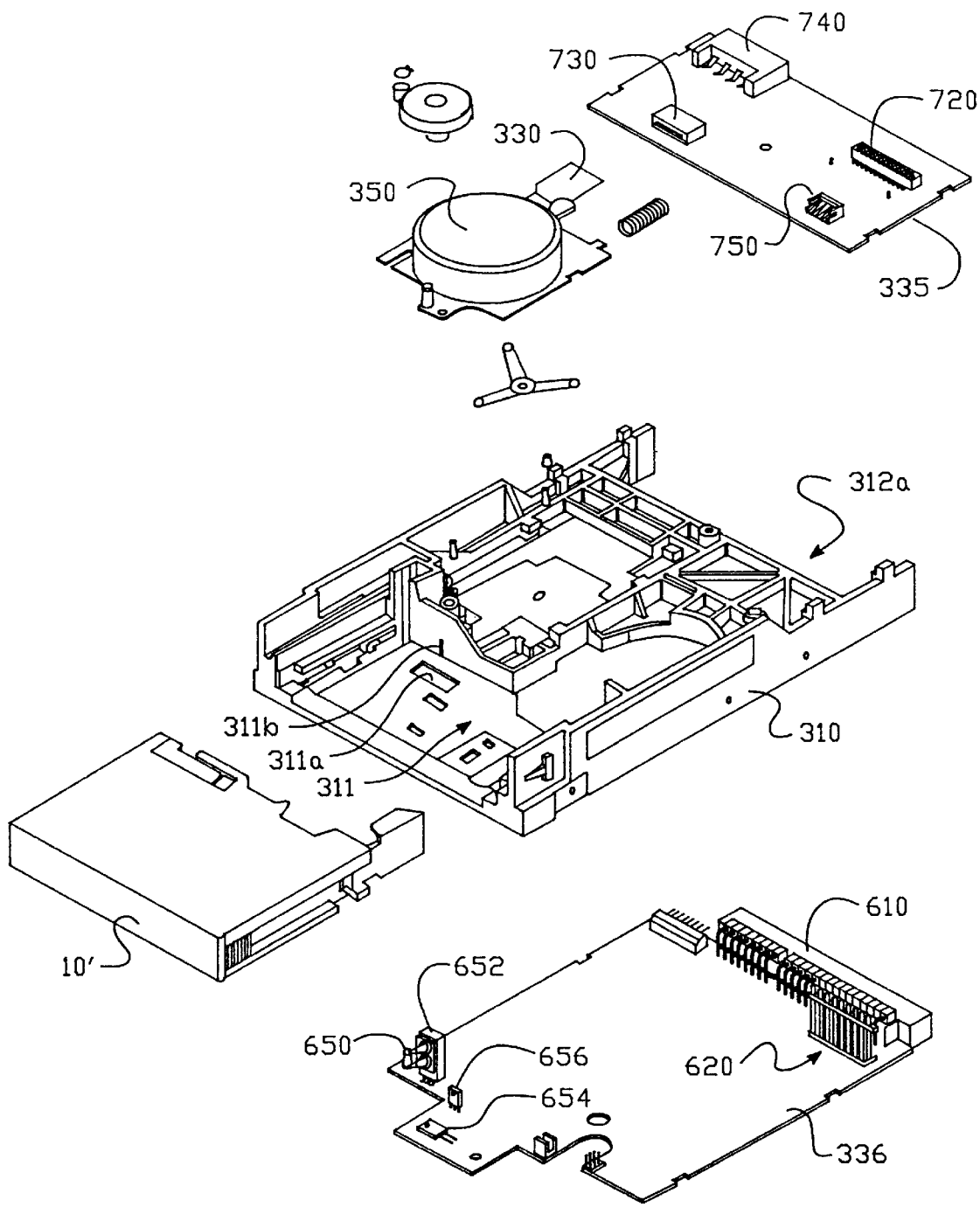
FIG. 3D is a fourth, exploded perspective view of the tape drive of FIG. 3A, showing the two printed circuit boards exploded away from the drive frame.

Referring to FIG. 3D, the lower electronics board 336 has a SCSI bus connector 610 provide at a back end of the board. An upwardly-projecting set of pins 620 is positioned in front of the SCSI bus connector 610. Pins 620 mate with a vertically overlying connector 720 on the upper electronics board 335 when the printed circuit boards are mounted to the frame 310. The upwardly-projecting pins 620 pass through the rear vertical cutout 312a of the frame to mate with overlying connector 720.

Connector 730 of the upper electronics board 335 receives to the free end of the flexible ribbon cable 330 extending from base plate 340. (Flexible ribbon cable 330 connects to the stator portion 352 of motor 350 via a printed circuit (not shown) that is adhesively attached to the top of the base plate 340.)

Connector 740 of the upper electronics board 335 connects to an external power supply (not shown). Connector 750 of the upper electronics board 335 connects to the head translating mechanism (not shown) of area 326 (FIG. 4).

At the front end of the lower electronics board 336 there is provided a status-indicating LED 650 (light emitting diode) for indicating various operating conditions of the drive by steady glow and flashing. A plastic light pipe (shown in FIG. 4 below the arrowhead of lead line 311) carries the output of the status-indicating LED 650 along an inner sidewall of the front-end cartridge-receiving portion 311 to a front panel (not shown) for viewing by a user.

The front end of the lower electronics board 336 also has a pair of microswitches 652 projecting upwardly therefrom. Microswitches 652 engage through a slot of the frame 310 with mechanical sense areas of an inserted cartridge 10 to detect cartridge presence and a write protect condition.

The front end of the lower electronics board 336 further has a second LED 654 positioned to project light up into a mirror opening 311a of the front-end cartridge-receiving portion 311. A phototransistor 656 is provided upstanding at the front end of the lower electronics board 336 for receiving mirror-reflected light from the cartridge by way of a light slit 311b provided at the back wall of the front-end cartridge-receiving portion 311.

Electronic components such as the status-indicating LED 650, status-detecting microswitches 652, second LED 654 and phototransistor 656 are interconnected at the front end of the drive by the lower electronics board 336 to appropriate input/output circuitry on board 336 and by way of such circuitry to the backend components such as the SCSI bus connector 610 and the inter-board connection pins 620 and further to the components of the upper electronics board 335. Part of the electronics and interconnect of the lower electronics board 336 occupies the one inch high vertical volume of the frame profile that is also shared by the low profile, rotor-on-the-outside motor 350. The low profile of motor 350 makes it possible to provide a compact tape drive mechanism 300 that has SCSI functionality built in together with lower-level tape drive control functions.

In brief summation of the above, it has been shown how a low cost, low stress, tape drive may be assembled with a relatively small number of parts and yet provide a high concentration of functionality, including providing an appropriate contact force F1 between the driven and drive rollers, and simultaneously providing room (319) for electronics or other capabilities in the vertical volume of the frame that is occupied by the drive motor (350). It should be observed that stresses resulting from the mass of the drive motor (350) are distributed across the drive frame 310 to be absorbed by a plurality of spatially distributed frame tabs 313, 313', 314 and 314' (and the base plate biasing spring 339). There is no singular pivot or other point that has to support the full mass of the base plate assembly (340, 350, 365) while providing low friction for allowing the assembly to translate against the contact-force control spring 320.

It should also be observed that the frame tabs 313, 313', 314 and 314' are integral parts of the molded frame 310. There is no need to separately add their functionality to the tape drive during manufacture. Thus assembly can take place much faster, the cost of manufacture is reduced, and since there are fewer separate parts; the probability that something will go wrong during manufacture is reduced.

It should be additionally observed that electronic functionality is distributed three-dimensionally about the frame 310, with the upper and lower electronics boards, 335 and 336, being folded about the top and bottom areas of the frame 310 while interconnect between these printed circuit boards is provided by the inter-board connection pins 620 that extend through the rear vertical cutout 312a. There is no need to add a separate interconnect cable between the boards. The interconnect is automatically made when the boards are mounted to their respective positions on the molded frame 310.

The above disclosure is to be taken as illustrative of the invention, not as limiting its scope or spirit. Numerous modifications and variations will become apparent to those skilled in the art after studying the above disclosure.

By way of example, to improve the frictional contact between the outer diameter of the motor rotor (356) and the drive roller (360), one may choose to add a rubber coating to the outside of the motor rotor (356) or to create gear-like serrations in the outer diameter of the motor rotor (356).

Given the above disclosure of general concepts and specific embodiments, the scope of protection sought is to be defined by the claims appended hereto.

What is claimed is:

1. A tape drive mechanism for driving a belt capstan of an inserted tape cartridge while applying a contact force within a prespecified force range to the belt capstan, wherein said tape cartridge has a capstan-access opening through which said contact force is applied, said mechanism comprising:

(a) a movable drive roller having a first outer diameter defined by an elastic contact surface, the elastic contact surface being engageable with the belt capstan, said movable drive roller being movable along a first plane during engagement of the elastic contact surface with the belt capstan;

(b) a movable rotor-on-the-outside motor having an external portion defining a motor rotor and an internal portion defining a motor stator surrounded by said rotor, said rotor of the movable motor being translatable along the first plane, said rotor having a second outer diameter that is substantially greater than the first outer diameter, wherein the second outer diameter of the rotor is defined by a substantially nonelastic contact surface that is engageable with the elastic contact surface of the drive roller; and (c) contact force generating means, operatively coupled to the motor, for applying a translational force to the movable motor, at least a portion of the translational force being transmitted along the first plane through the motor rotor and through the movable drive roller to the belt capstan of the inserted tape cartridge to thereby produce the contact force within the prespecified force range between the belt capstan and the drive roller.

2. A tape drive mechanism according to claim 1 further comprising:

(a.1) one or more guides operatively coupled to said movable drive roller for constraining said translational movement of the drive roller to an essentially linear path within said first plane while the drive roller is engaged with the belt capstan and the rotor.

3. A tape drive mechanism according to claim 2 wherein said contact force generating means includes (c.1) a linearly compressible spring which compresses linearly to define the magnitude of said translational force.

4. A tape drive mechanism according to claim 1:

(b.1) wherein said motor rotor includes a cylindrical portion composed of magnetically conducting material that shields external devices from internal flux fields of the motor; and (b.2) wherein said substantially nonelastic contact surface of the rotor is defined by part of the magnetically conducting cylindrical portion.

5. A tape drive mechanism according to claim 1 wherein:

(b.1) said rotor-on-the-outside motor is a DC brushless motor, (b.2) said rotor includes a cylindrical rotor portion composed of magnetically conducting material;

(b.3) said rotor further includes a plurality of permanent magnets distributed about an inner perimeter of the cylindrical rotor portion; and (b.2a) the magnetically conducting, cylindrical rotor portion defines the substantially nonelastic contact surface that is engageable with the elastic contact surface of the drive roller.

6. A tape drive mechanism according to claim 1 further comprising:

(d) a moveable base plate, wherein the stator of said rotor-on-the-outside motor is mounted on the base plate, the base plate is constrained to move in a second plane parallel to said first plane, and (b.1) further wherein the drive roller is coupled to the base plate and adapted to move freely away from the rotor when the tape cartridge is not inserted.

7. A tape drive mechanism according to claim 6 wherein said base plate includes (d.1) a printed circuit coupled to the stator.

8. A tape drive mechanism according to claim 7 further comprising:

(e) a flexible cable coupled to the printed circuit of the base plate for conducting electric signals between the stator and an external module and for flexing to permit easy movement of the base plate along said second plane.

9. A tape drive mechanism according to claim 7 further comprising:

a printed circuit board that is electrically coupled to the rotor-on-the-outside motor;

and further wherein:

(c.1a) said linearly compressible spring extends adjacent to and substantially parallel to the printed circuit board.

10. A tape drive mechanism according to claim 7 wherein said base plate further includes:

a rigid, electrically insulative material having said printed circuit formed on a top surface of the insulative material; and a magnetic shield formed on a bottom portion of the base plate.

11. A tape drive mechanism according to claim 10 wherein said magnetic shield includes a plated-on magnetically conductive material.

12. A drive mechanism according to claim 1 wherein:

said drive roller is free to disengage from the rotor when the drive roller is not forcibly engaged against by the capstan.

13. A tape drive mechanism according to claim 1 wherein said outer diameter of the rotor has gear-like serrations.

14. A tape drive mechanism according to claim 1 wherein said rotor-on-the-outside motor includes one or more bearings arranged in or symmetrically about the first plane, where said first plane cuts centrally through the elastic contact area of the drive roller.

15. A tape drive mechanism according to claim 1 further comprising:

a movable base supporting said rotor-on-the-outside motor; and a one-piece frame surrounding said movable drive roller, said movable base, said rotor-on-the-outside motor, and said contact force generating means;

wherein the base slides against one or more portions of the one-piece frame.

16. A tape drive mechanism according to claim 15 wherein said portions of the one-piece frame against which the base slides include at least four such portions symmetrically distributed relative to the base.

17. A tape drive mechanism according to claim 16 further comprising:

a spacing spring for pressing said base symmetrically against the at least four portions.

18. A tape drive mechanism according to claim 15 wherein:
said one-piece frame has one or more guide pins secured thereto;
said base has one or more guide slots defined therein for engaging with the one or more guide pins and thereby guiding movement of the base along a linear path.

19. A tape drive mechanism according to claim 15 wherein:
said one-piece frame has first spring retaining tab; and
said base has a second spring retaining tab positioned to oppose the first spring retaining tab such that opposed ends of a tubular spring can be retained by the first and second spring retaining tabs.

20. A tape drive mechanism according to claim 15 wherein:
said one-piece frame has a plurality of base-retaining tabs; and
said base has a corresponding plurality of assembly slots defined therein for allowing insertion of the base past the base-retaining tabs during manufacture.

21. A tape drive mechanism according to claim 15 wherein:
said one-piece frame is composed of a composite material having Teflon™ particles embedded in surface areas of the composite material for providing low friction characteristics to said surface areas.

22. A tape drive mechanism according to claim 21 wherein:
said composite material includes a polycarbonate and glass fibers.

23. A tape drive mechanism according to claim 15 further comprising:
a first electronics board supported within said frame and extending below said base in a first electronics plane that is spaced apart and parallel to said first plane.

24. A tape drive mechanism according to claim 23 further comprising:
a second electronics board supported within said frame and extending in a second electronics plane above said base, said second electronics plane being spaced apart and parallel to said first electronics plane;
wherein said one-piece frame has a first cutout defined therethrough; and
wherein said first and second electronics boards are electrically interconnected to one another through said first cutout.

25. A tape drive mechanism according to claim 1 wherein said rotor-on-the-outside motor operates at a nominal speed in the range of 810 RPM to 1216 RPM.

26. A tape drive mechanism according to claim 1 wherein said rotor-on-the-outside motor can power an external torque load of at least 4.8 ounce-inches in continuous mode.

27. A tape drive mechanism according to claim 1 wherein said rotor-on-the-outside motor has a height of less than half an inch.

28. A tape drive mechanism according to claim 1 further comprising:
a substantially planar base having top and bottom sides; wherein:
said rotor of the rotor-on-the-outside motor has a first height;
said drive roller has a second height less than the first height of the rotor;
both the rotor-on-the-outside motor and the drive roller are mounted on the top side of the base such that the elastic contact surface of the drive roller, when engaged with the nonelastic contact surface of the rotor, engages a bottom portion of the first height of the rotor and thereby leaves free a space above the drive roller and to the side of the rotor for passage therethrough of a support member.

29. A tape drive mechanism according to claim 28 further comprising:
a pivot pin extending from the top side of the base; and
a pivot arm pivotally mounted to the pivot pin, said pivot arm including a downwardly-projecting member extending into the plane of the base;
wherein the base has a capture hole formed therein for receiving the downwardly-projecting member, the capture hole being sized bigger than the downwardly-projecting member so as to allow sufficient play for the elastic contact surface of the drive roller to engage with and disengage from the nonelastic contact surface of the rotor while the downwardly-projecting member is retained within the capture hole.

30. A method for transmitting rotational power from a motor to a driven roller while engaging the driven roller with a contact force (F1) of predefined magnitude, said method comprising the steps of:
(a) providing a reciprocatable base plate onto which said motor is mounted;
(b) limiting movement of said reciprocatable base plate substantially to one linear path extending in a first direction;
(c) biasing the base plate with a control force (F2) exerted in said first direction;
(d) providing a translatable drive roller that is linearly translatable in said first direction and is engageable with an output portion of the motor and is further engageable with the driven roller;
(e) engaging the driven roller against the translatable drive roller so as to translate the drive roller into engagement with said output portion of the motor; and
(f) setting the control force (F2) such that the force of engagement between the translatable drive roller and the driven roller is substantially equal to the predefined contact force (F1).

31. A drive mechanism comprising:
(a) a rotor-on-the-outside motor having an external portion defining a rotor and an internal portion defining a stator surrounded by said rotor, said rotor being rotatable such that a first point on the rotating rotor describes a hypothetical first circle within a hypothetical first plane, said rotor being capable of generating a rotational force and said rotor also being translatable along a linear path in the hypothetical first plane;
(b) a drive roller that is also rotatable within the hypothetical first plane such that a second point on the rotating drive roller describes a hypothetical second circle within the hypothetical first plane, said drive roller also being translatable along linear path in the first plane; and
(c) a spring mechanically coupled to the rotor for applying a translational force to the rotor and urging the rotor to translate towards contact with the drive roller such that at least parts of both the rotational force and the translational force of the rotor are coupled to the drive roller when the rotor and drive roller contact one another.

32. A drive mechanism according to claim 31 further comprising:
   (d) a movable base supporting the stator, wherein the base is movable along a second plane separate from the first plane and wherein the translational force is transmitted to the rotor by way of the movable base, and wherein said motor includes:
   (a.1) a rotor bearing, fastened to one or both of the stator and the base for rotatably supporting the rotor, said rotor bearing having a plurality of bearing balls arranged either in the first plane or arranged symmetrically about the first plane so as to minimize the magnitude of cross-axial moment applied to the motor bearing due to said translational force being transmitted to the rotor by way of the movable base.

33. A drive mechanism according to claim 32 further comprising:
   (e) a printed circuit provided on said base for coupling electrical drive power to the stator of said motor.

34. A drive mechanism according to claim 31 further comprising:
   (d) a capture-well operatively situated relative to the drive roller for defining a limited region in the first plane to which the first plane translation of the drive roller is limited.

35. A drive mechanism according to claim 31 further comprising:
   (d) a movable base supporting the stator, wherein the base is movable along a second plane separate from the first plane and wherein the translational force is transmitted to the rotor by way of the movable base, and
   (e) strain relief means operatively situated relative to movable base for defining a limited region in the second plane to which the movement of the base is limited so that when the base abuts against a boundary of the limited region, said abutment absorbs at least part of the translational force of the spring.

36. A drive mechanism according to claim 31 further comprising:
   (d) a movable base supporting the stator, wherein the base is movable along a limited linear path within a second plane that is separate from the first plane and wherein the translational force is transmitted to the rotor by way of the translation of the movable base along said linear path.

37. A drive mechanism according to claim 31 wherein said spring is a helical spring having a central axis along which axis said translational force is transmitted.

38. A drive mechanism according to claim 37 further comprising:
   (d) a frame for movably supporting said motor and for restraining one end of said helical spring.

39. A drive mechanism for frictional engagement with a supplied driven roller and for imparting a rotational force to the driven roller, said drive mechanism comprising:
   (a) a rotor-on-the-outside motor having an external portion defining a rotor and an internal portion defining a stator surrounded by said rotor, said motor being moveable;
   (b) a driving roller that is retractably engageable with said rotor, said driving roller being itself retractably engageable by the driven roller, the driving roller being normally spaced apart from the rotor when not forcibly engaged against by the driven roller and the driving roller being moveable such that when the driving roller is forcibly engaged against by the driven roller, the driving roller moves into engagement with the rotor; and
   (c) a spring operatively coupled to the moveable rotor-on-the-outside motor such that when the driving roller is forcibly engaged against the rotor, the spring defines the magnitude of engagement force between the driven roller and the driving roller.

40. A drive mechanism according to claim 39 further comprising:
   a guide coupled to the moveable motor for causing the motor to move along a linear path.

41. A drive mechanism according to claim 39 further comprising:
   a guide coupled to the driving roller for causing the driving roller to move along a linear path while the driven roller is forcibly engaged against the driving roller.

42. A drive mechanism according to claim 39 wherein:
   said engagement of the driven roller against the driving roller occurs within a first plane and said engagement of the driving roller against the rotor occurs within said first plane.

43. A drive mechanism according to claim 42 wherein:
   (a.1) said rotor is mounted on a bearing means and said bearing means is symmetrically disposed relative to said first plane.

44. A drive mechanism according to claim 39 wherein said spring extends parallel to said first plane.

45. A drive mechanism according to claim 39 wherein:
   (a.1) said rotor has a metal surface portion that comes into engagement with the driving roller; and
   (b.1) said driving roller has an elastic portion that correspondingly comes into engagement with the metal surface portion of the rotor.

46. A drive mechanism according to claim 45 wherein said metal surface portion includes nickel.

47. A drive mechanism according to claim 39 further comprising:
   (d) a one piece molded frame supporting the rotor-on-the-outside motor and retaining a first end of said spring.

48. A drive mechanism according to claim 47 further comprising:
   (e) a base slidably supported in said frame and retaining a first end of said spring;
   wherein said motor is coupled to the base.

49. A drive mechanism according to claim 48 wherein said one piece molded frame includes a first strain relief feature operatively situated relative to the movable base for defining a limited region of movement for the base and for absorbing at least part of the force of the spring when the driven roller is not forcibly engaged against the driving roller.

50. A drive mechanism according to claim 49 wherein said one piece molded frame includes a second strain relief feature operatively situated relative to the driving roller for absorbing at least part of an insertion force of the driven roller if the driven roller is inserted against the driving roller with a force exceeding said spring-defined engagement force.

* * * * *

UNITED STATES PATENT AND TRADEMARK OFFICE
CERTIFICATE OF CORRECTION

PATENT NO. : 5,833,161
DATED : November 10, 1998
INVENTOR(S) : Ash Nayak et al.

It is certified that error appears in the above-indentified patent and that said Letters Patent is hereby corrected as shown below:

Column 10, line 23, "31'" should be --313'--.
Column 16, line 58, "along linear" should be --along the linear--.

Signed and Sealed this

Twentieth Day of July, 1999

Attest:

Q. TODD DICKINSON

*Attesting Officer*   *Acting Commissioner of Patents and Trademarks*